Patented Nov. 7, 1939

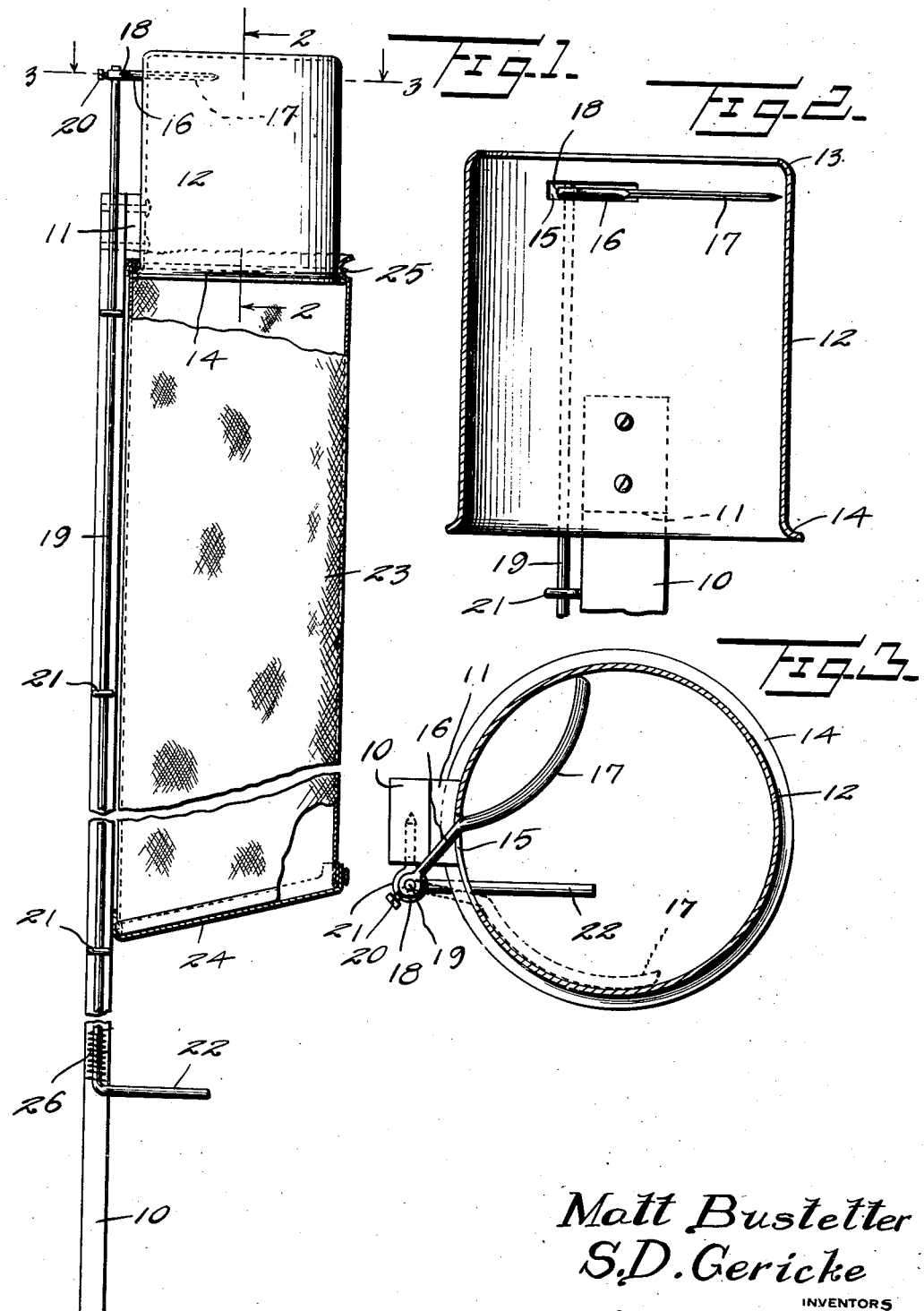

2,179,031

UNITED STATES PATENT OFFICE 2,179,031

FRUIT PICKER

Matt Bustetter and Samuel Dannel Gericke, Yakima, Wash.

Application April 25, 1938, Serial No. 204,207

1 Claim. (Cl. 56—336)

The invention relates to a gathering device and more especially to a fruit picker.

The primary object of the invention is the provision of a device of this character, wherein apples or other fruits or the like, particularly those diseased or infested with worms or other fruit-destroying pests, can be removed from a tree without necessitating a person's reaching or climbing the tree for such removal, the device being of novel construction and assures the picking of the fruit with dispatch and with the least possible exertion on the part of the user of such device.

Another object of the invention is the provision of a device of this character, wherein a mouth piece has removably fitted therewith a sack or bag provided with a detachable bottom and thus the gathered fruit can be readily extracted or released when collected in said bag or the like.

A further object of the invention is the provision of a device of this character, wherein a growing crop of fruit can be readily thinned without the use of a ladder or other medium and such fruit to be removed can be conveniently and easily acquired.

A still further object of the invention is the provision of a device of this character, which is simple in its construction, thoroughly reliable and efficient in operation, light in weight thus enabling the ready and easy handling thereof yet strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation partly in section of the device constructed in accordance with the invention.

Figure 2 is an enlarged vertical longitudinal sectional view showing in detail the mouth piece of the device being taken on the line 2—2 of Figure 1 looking in the direction of the arrows.

Figure 3 is a sectional view on the line 3—3 of Figure 1 looking in the direction of the arrows.

Similar reference characters indicate corresponding parts throughout the several views in the drawing.

Referring to the drawing in detail, the device constituting the present invention comprises a pole 10 preferably of the required length having at one end thereof a bracketing element 11 for a tubular or sleeve-like mouth piece 12 preferably made from metal open at opposite ends while one of these ends has an inwardly curled annular lip 13 and the other end being outwardly flared to provide an annular flange 14, respectively.

The mouth piece 12 is provided with an elongated slot 15 adjacent to the lip 13 and through which is passed the arm 16 of a curved knife 17. The arm 16 is provided with a hub terminal 18 releasably fitted upon an operating rod 19 preferably through the medium of a key or set screw 20. The operating rod is journaled in bearings 21 fitting the pole at one side thereof. This rod at its end remote from the knife 17 is provided with a crank handle 22 for manual turning of said rod.

Releasably carried upon the mouth piece 12 and depending therefrom is a bag 23 provided with a removable bottom piece 24 while the opposite open end of said bag is telescoped over the mouth piece 12 and is held releasably engaged thereon by a retaining element 25 of contractible ringlike form. The rod 19 is acted upon by a coiled tensioning spring 26 suitably fitted about said rod and having one end fixed thereto or to the crank handle 22 and the pole 10, respectively.

This spring functions to hold the knife 17 close to or in contact with one side of the mouth piece interiorly thereof so as to not interfere with the gathering of fruit which enters the said mouth piece through the lip end 13 thereof. The knife, when actuated, will sever the stem of the fruit for its removal from a tree or the like.

The releasable bottom 24 of the bag 23 enables the discharge of contents thereof with dispatch. The bag 23 is removable from the mouth piece 12 for the cleaning thereof or for a replacement bag when the occasion requires.

What is claimed is:

A fruit picker comprising a flat-faced pole, a cylindrical body open at opposite ends and arranged parallel with the pole, a bracketing element at one end of the pole and supporting the cylindrical body extended beyond the pole, a turnable rod journaled on said pole and having a turning handle remote from said cylindrical body, a knife blade extended within the cylindrical body adjacent to one open end thereof and swingable transversely of said body, a hub terminal on said blade and releasably fitting the said rod, means securing the hub terminal releasably fitted to the rod, and a spring engaged against one flat face of the pole and connected with said rod for exerting tension on the latter and holding the blade normally adjacent to one side of the cylindrical body.

MATT BUSTETTER.
SAMUEL DANNEL GERICKE.